(No Model.)
S. B. ROBBINS.
HARVESTER REEL.
No. 271,125. Patented Jan. 23, 1883.
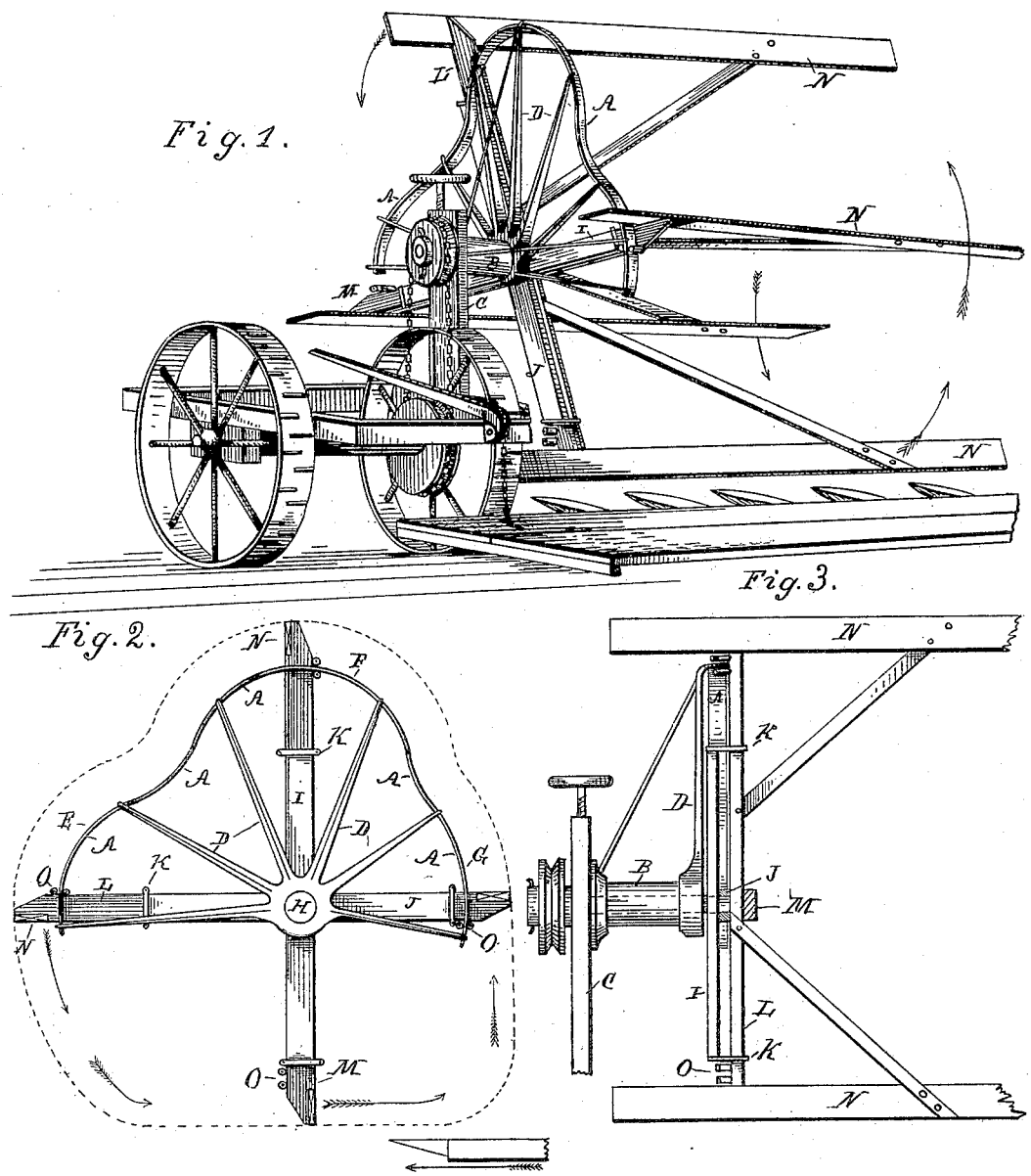
WITNESSES:
Thos. Houghton.
A. G. Syne
INVENTOR:
S. B. Robbins
BY
ATTORNEYS.

United States Patent Office.

SYLVAN B. ROBBINS, OF LAWRENCEBURG, INDIANA.

HARVESTER-REEL.

SPECIFICATION forming part of Letters Patent No. 271,125, dated January 23, 1883.

Application filed June 10, 1882. (No model.)

*To all whom it may concern:*

Be it known that I, SYLVAN BALDWIN ROBBINS, of Lawrenceburg, in the county of Dearborn and State of Indiana, have invented a new and useful Improvement in Harvester-Reels, of which the following is a full, clear, and exact description, reference being had to the annexed drawings, forming part of this specification.

The object of this invention is to give a horizontal raking movement to the beaters of a harvester-reel, whereby the grain shall be held back over the table while being severed by the sickle.

In the drawings, Figure 1 is a perspective view of a portion of a harvester, showing my invention. Fig. 2 is an end elevation of the reel, showing a cam for giving the desired movement thereto; and Fig. 3 is a sectional view of the reel.

My invention consists in providing a reel having sliding bars for the beaters and a stationary cam, with which the bars are adapted to engage to give a definite movement to the beaters. To this end a cam, A, formed of a sinuous bar or strip of metal, is supported above and at the sides of the axis of the reel by means of a sleeve, B, secured to the standard C, and having a series of radiating fingers, D, connected to the strip of metal. The said fingers are made of such relative lengths that the surface of the cam shall present three distinct protuberances, E F G, as shown.

The shaft H of the reel, which is supported within the sleeve B, is rigidly connected at the end to the center of two short cross-bars, I J, which latter, if desired, may be slightly mortised into each other. The bars I J are provided at their ends with loops K, of sufficient size to receive the bars L M, to the ends of which the beaters N are connected. The bars L M are laid across each other at or near the center, in which relative position they are held by the loops K, and are adapted to slide upon each other in their respective loops. This sliding movement is accomplished by means of rollers O, which are secured in pairs at points near the ends of the bars L M and the cam A, with opposite sides of which the pairs of rollers engage during a part of each revolution of the reel. With this construction each beater N is made to move horizontally while in contact with the grain, as indicated in dotted lines in Fig. 2, and thus the grain will be inclined toward the sickle and held in that position until severed, when it drops upon the table. The advantage of so holding the grain is to facilitate the cutting of it, as well as to secure its falling upon the table in perfect order.

It is evident that such a reel is specially adapted for use where the grain from overripeness or any other cause has become tangled or bent over. As the reel moves horizontally near the ground for a considerable space, any such grain will be straightened out and inclined toward the table by the raking effect of the beaters.

Having thus described my invention, what I claim, and desire to secure by Letters Patent, is—

1. The combination, with a suitable cam, of the reel having the short cross-bars rigidly connected to the shaft and provided with loops at the ends, and the sliding bars arranged across each other within the said loops, respectively, and having means for engaging with the cam, whereby an eccentric movement shall be given to the beaters, substantially as and for the purpose specified.

2. The combination, with the reel having the beaters adapted to move eccentrically during revolution, of the cam, consisting of a sinuous strip of metal supported by a sleeve having radiating fingers secured to the strip, in such manner that a series of rollers connected to the reel shall engage with the cam on opposite sides thereof, substantially as shown and described, and for the purpose set forth.

SYLVAN B. ROBBINS.

Witnesses:
SOLON C. KEMON,
JOHN T. LAWRENCE.